Figure 1:
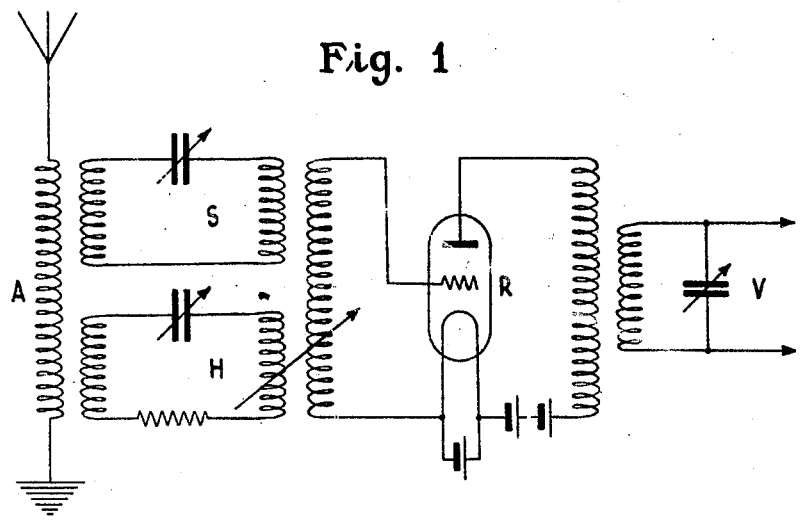

April 9, 1929.   A. ESAU   1,708,536
ARRANGEMENT FOR ELIMINATING DISTURBING OSCILLATIONS
Filed Oct. 18, 1923   2 Sheets-Sheet 1

INVENTOR
ABRAHAM ESAU
ATTORNEY

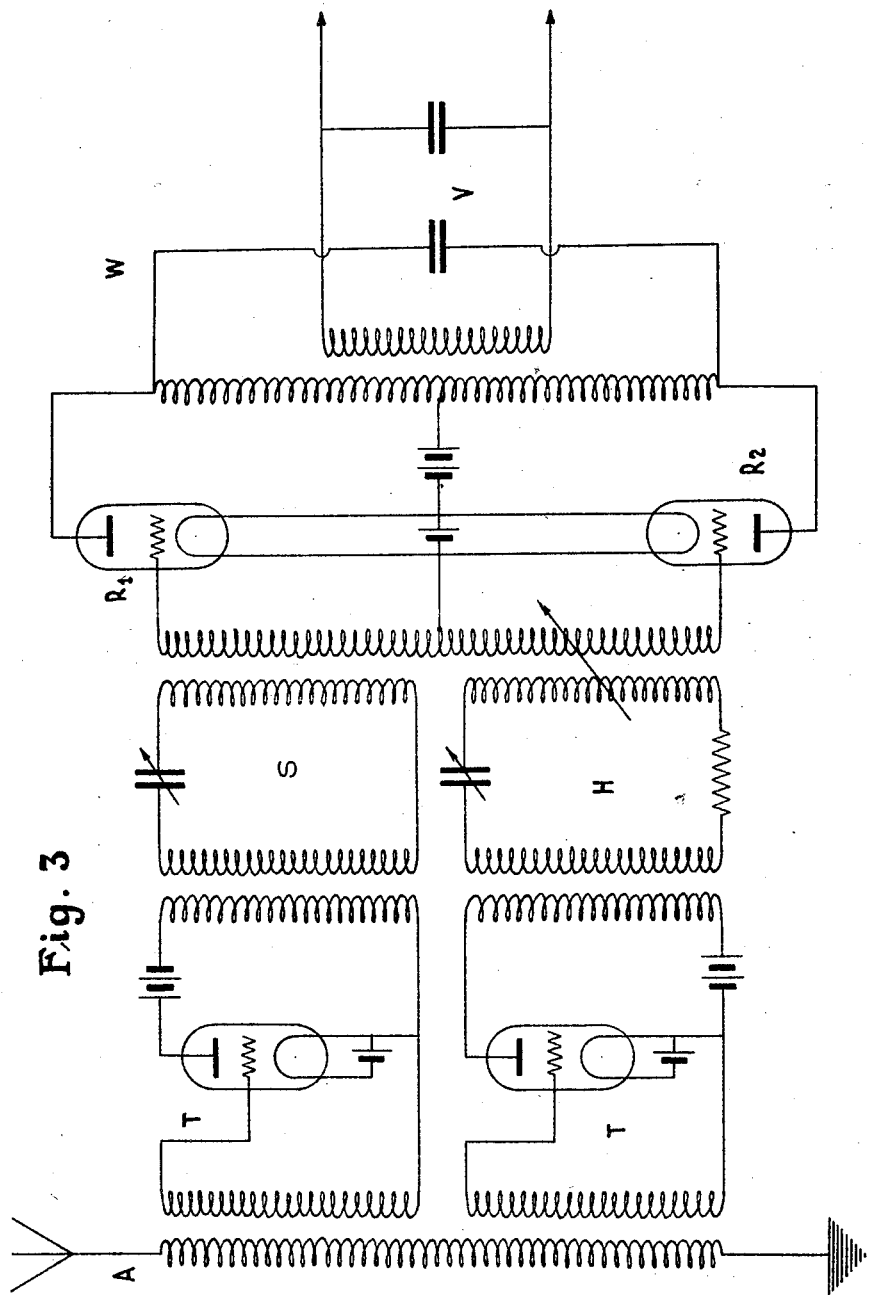

Patented Apr. 9, 1929.

1,708,536

UNITED STATES PATENT OFFICE.

ABRAHAM ESAU, OF BERLIN, GERMANY, ASSIGNOR TO RADIO CORPORATION OF AMERICA, A CORPORATION OF DELAWARE.

ARRANGEMENT FOR ELIMINATING DISTURBING OSCILLATIONS.

Application filed October 18, 1923, Serial No. 669,253, and in Germany November 8, 1922.

Two methods for completely eliminating disturbing oscillations in receiving systems are known; first, that of branching off a current and second, that which employs an auxiliary circuit (N. V. Korshenewsky and Max Wien; Yearbook of Wireless Telegraphy and Telephony, volume 20, numbers 5 and 6). These methods add further couplings to the already existing couplings of two systems, and the new couplings can be regulated by suitable adjustments of at least two variables, so that counter-voltages of such phase and amplitude are produced in the system as to cause the disturbing oscillations to be completely reduced to zero. The elimination of disturbances is especially important in wireless communication, as the number of high power wireless stations and amateur stations is steadily increasing. However, it is also of special importance that the reception itself is not weakened or at least only to a small degree by the provision of arrangements for eliminating disturbances. According to the theory of the above-mentioned work, two circuits which have very different decrements and which are detuned to the interfering wave are used in order to satisfy this condition. It has been assumed, however, that no disturbing reactions of the resonant systems occur, whereas most receiving arrangements require the use of radio frequency amplifiers, together with a compensating arrangement, and in such case, a reaction of the tuned input circuit of the radio frequency amplifier on the selection circuit and the counter coupling circuit take place with the results that, firstly, the strength of the received signal is greatly weakened and secondly, practical operation of the arrangement is made very difficult since its adjustments are very unstable being liable to disturbance by the slightest outside influences.

According to the invention, these difficulties are obviated by using couplings associated with a vacuum tube or tubes which prevent any reaction, and complete reliability of receiving service of highest selection is thus attained by utilizing the counter-coupling method under conditions which preclude reaction.

Figure 2:
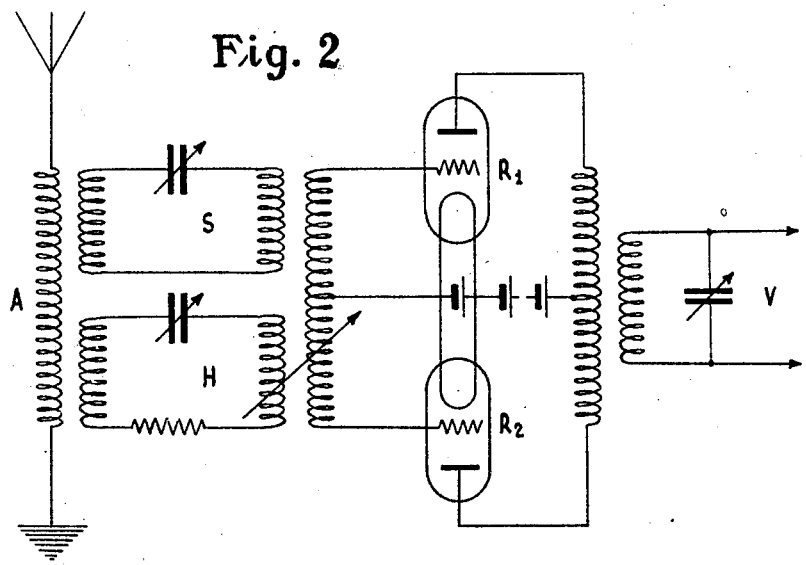

In the drawing,

Fig. 1 is a diagrammatic representation of a circuit arrangement embodying the invention, and Figs. 2 and 3 are diagrammatic representations of circuit arrangements of modified form.

In Figs. 1, 2 and 3, A is the aerial, S the secondary selection circuit, H the counter-coupling circuit which according to the counter-coupling theory and in contrast to formerly known arrangements, is not tuned to the disturbing wave but must be detuned with respect to it and must also have a considerably different damping from that of the circuit S. V is the input circuit of a radio frequency amplifier. According to the previously known uncoupling-method, both circuits S and H would be directly coupled to the radio frequency amplifier V but according to the present invention the coupling is effected across a vacuum tube R, Fig. 1. In this way, not the radio frequency amplifier-circuit V but the grid-circuit of the tube R is counter-coupled. In the slightly modified arrangement shown in Fig. 2, the non-reactive coupling is effected across two oppositely connected vacuum tubes $R^1$ and $R^2$. The symmetry of this arrangement is useful for eliminating sudden capacitive influences. In the arrangements shown in Figs. 1 and 2, the vacuum tubes work aperiodically, but it is possible to insert in their anode circuits an oscillatory circuit W, Fig. 3, tuned to the frequency of the received wave. In some cases it is preferable to couple the circuits H and S to the aerial also across vacuum tubes T. An arrangement according to the drawing has proved most successful in practice. Thus for instance, it has been found possible to eliminate the oscillations of a disturbing station, the wavelength of which was only ½% different from that of the received wave without the intensity of the received wave being weakened although the intensity of the disturbing wave was 100 times greater than that of the received wave.

Having described my invention, what I claim is:

1. An arrangement for eliminating disturbing oscillations, comprising a radio frequency amplifier having a tuned input circuit, an aerial, two circuits coupled with the aerial and including a plurality of devices for varying the constants of the circuits so as to produce in one of said circuits counter-voltages of such phase and magnitude as to balance out disturbing oscillations in the other of said circuits, and a vacuum tube coupling means interposed between the radio frequency amplifier and said circuits for coupling said amplifier and said circuits and for preventing reaction of the said amplifier upon said circuits.

2. An arrangement for eliminating disturbing oscillations, comprising a radio frequency amplifier having a tuned input circuit, an aerial, two circuits coupled with the aerial and including a plurality of devices for varying the constants of the circuits so as to produce in one of said circuits counter-voltages of such phase and magnitude as to balance out disturbing oscillations in the other of said circuits, and oppositely connected vacuum tubes interposed between the radio frequency amplifier and said circuits for preventing reaction of the amplifier upon said circuits, said tubes having their input circuits coupled to the respective first-mentioned circuits and having their anode circuits coupled to said radio frequency amplifier.

3. An arrangement for eliminating disturbing oscillations comprising a radio frequency amplifier, an aerial, two circuits coupled with the aerial and including a plurality of devices for varying the constants of the circuits so as to produce in one of them counter-voltages of such phase and magnitude as to balance out disturbing oscillations in the other, vacuum tubes interposed between said radio frequency amplifier and said circuits for preventing reaction of the amplifier upon them, and vacuum tubes also interposed between said circuits and the aerial for preventing reaction from said circuits on the aerial.

4. An arrangement for eliminating disturbing oscillations, comprising a radio frequency amplifier having a tuned input circuit, an aerial, two circuits coupled with the aerial and including a plurality of devices for varying the constants of the circuit so as to produce in one of them counter-voltages of such phase and magnitude as to balance out disturbing oscillations in the other and oppositedly connected vacuum tubes interposed between the radio frequency amplifier and said circuits for preventing reaction of the amplifier upon them, said vacuum tubes having an oscillatory circuit on the output side tuned to the frequency of the energy which it is desired to receive.

5. In combination, a source of desired and undesired energies, a radio frequency amplifier having a tuned input circuit, a plurality of paths equally conductive to undesired signal energy and unequally conductive to desired signal energy coupled to said source and arranged between said source and said amplifier, and non-reactive thermionic relay means for impressing the said desired energy on said amplifier and also the undesired energies from said paths in opposite sense on said amplifier.

6. In combination, an antenna circuit, a receiving circuit, a plurality of intermediate circuits through which said antenna circuit and said receiving circuit are coupled, means whereby said intermediate circuits impress undesired energies on said receiving circuit in opposite sense and only one of said circuits impresses desired energy on said receiving circuit, and non-reactive couplings between said antenna circuit and each of said intermediate circuits.

Dr. ABRAHAM ESAU.